Sept. 11, 1962   W. S. SIMMIE   3,053,973
RESISTANCE WELDING
Filed Dec. 30, 1960   3 Sheets-Sheet 1

INVENTOR
WALTER STEWART SIMMIE
BY
*Karl L. Schiff*
His AGENT

United States Patent Office 3,053,973
Patented Sept. 11, 1962

3,053,973
RESISTANCE WELDING
Walter Stewart Simmie, Headington, England, assignor to Pressed Steel Company Limited, Oxford, England, a British company
Filed Dec. 30, 1960, Ser. No. 79,674
1 Claim. (Cl. 219—116)

The present invention relates to resistance welding.

In the provisional specification accompanying my co-pending patent application No. 9,475/59 there is described a method of effecting multiple welds in which two workpieces are arranged in overlapping relation. A plurality of welding electrodes are brought into contact with one of the workpieces and a polyphase supply circuit is completed from the secondary windings of a polyphase transformer or transformers to the welding electrodes. The secondary windings are short-circuited to one another through the workpieces and the short-circuited current effects welding. The workpieces are preferably supported on a conventional copper back-up-bar.

There is also described in the aforesaid specification a method of effecting a sequence of welds along a seam by moving the plurality of welding electrodes to a number of welding positions in succession, either manually or automatically, and switching-on the welding current at each position.

It is the object of the present invention to provide an improved method of effecting multiple welds.

According to the present invention a method of effecting a plurality of welds by resistance welding comprises the steps of arranging two workpieces in overlapping relation and bringing a plurality of welding electrodes into contact with one of the workpieces at the respective positions at which welding is to be effected, the electrodes being connected in groups to the secondary windings of a polyphase transformer or transformers, corresponding electrodes in the different groups being connected to the same secondary winding, and energising the electrode groups in sequence so that the secondary windings are short-circuited to one another through the workpiece as each group of electrodes is energised.

Thus instead of providing a single group of electrodes and moving the group to a succession of welding positions, there are as many groups as there are welding positions and the groups are energised in sequence.

As in the method described in the aforesaid specification, the secondary windings can be connected either in star or mesh.

The invention also provides a machine for effecting a plurality of welds between two workpieces by resistance welding, the machine comprising preferably a back-up bar and a plurality of groups of welding electrodes (three or a multiple of three in each group) spaced from the bar and provided with operating means for urging the electrodes in the said groups towards the bar to effect welding of two workpieces when placed between the back-up bar and the welding electrodes, a three-phase transformer with its secondary windings so connected to one another and to the groups of electrodes by a bus-bar system as to be short-circuited through the workpieces when any selected group of electrodes is urged into contact with the workpieces and operating means adapted automatically to urge the group of electrodes towards the back-up bar in a predetermined sequence for effecting a corresponding sequence of groups of welds.

The invention will now be described by way of example with reference to the accompanying drawings in which.

Figure 1:
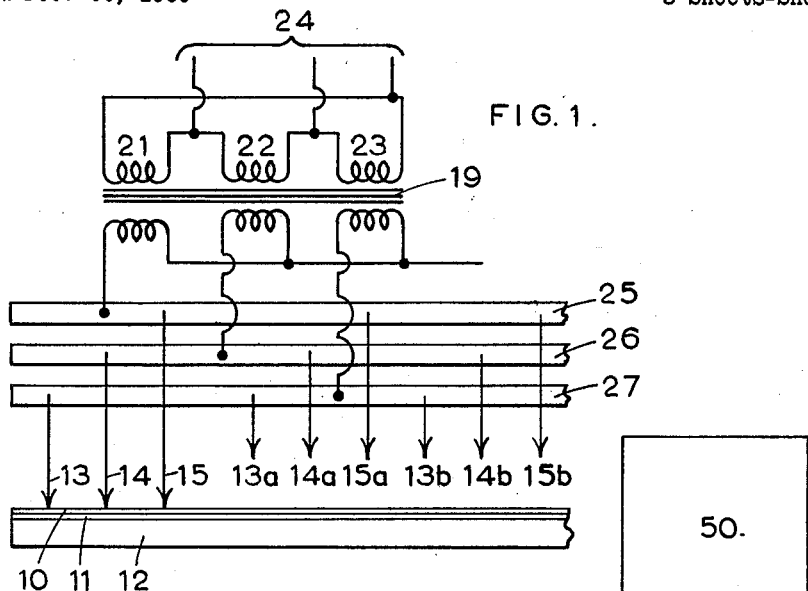
FIGURE 1 is a schematic diagram of a welding apparatus.

Referring to FIGURE 1, two workpieces 10 and 11 to be welded by resistance welding are arranged in overlapping relation on a copper back-up bar 12. Three welding electrodes, 13, 14 and 15, are arranged to contact the workpiece 10 remote from the back-up bar 12.

A three phase transformer 19 has three primary windings 21, 22 and 23 connected in mesh to a three-phase supply 24.

Three secondary windings 16, 17 and 18 are connected to one another through the connection 20 and are thus connected in star. The other ends of the secondary winding are connected to three horizontal copper bus-bars 25, 26 and 27 respectively, either by copper bars or by cables preferably feeding both ends of each bus-bar.

Each bus-bar is connected to a number of welding electrodes. The electrodes are arranged in groups of three and the connections from each bus-bar extend to corresponding electrodes in the three groups, for example bus-bar 26 is connected to electrodes 14, 14a, 14b, and so on.

There is provided means (not shown) for urging each group of electrodes in sequence into contact with the workpiece 10, and a contactor control mechanism, of any suitable kind, whereby the circuits to the groups are completed in a corresponding sequence and the short-circuit currents flowing between the electrodes of each group through the workpieces serve to effect welding of the workpieces.

Figure 2:
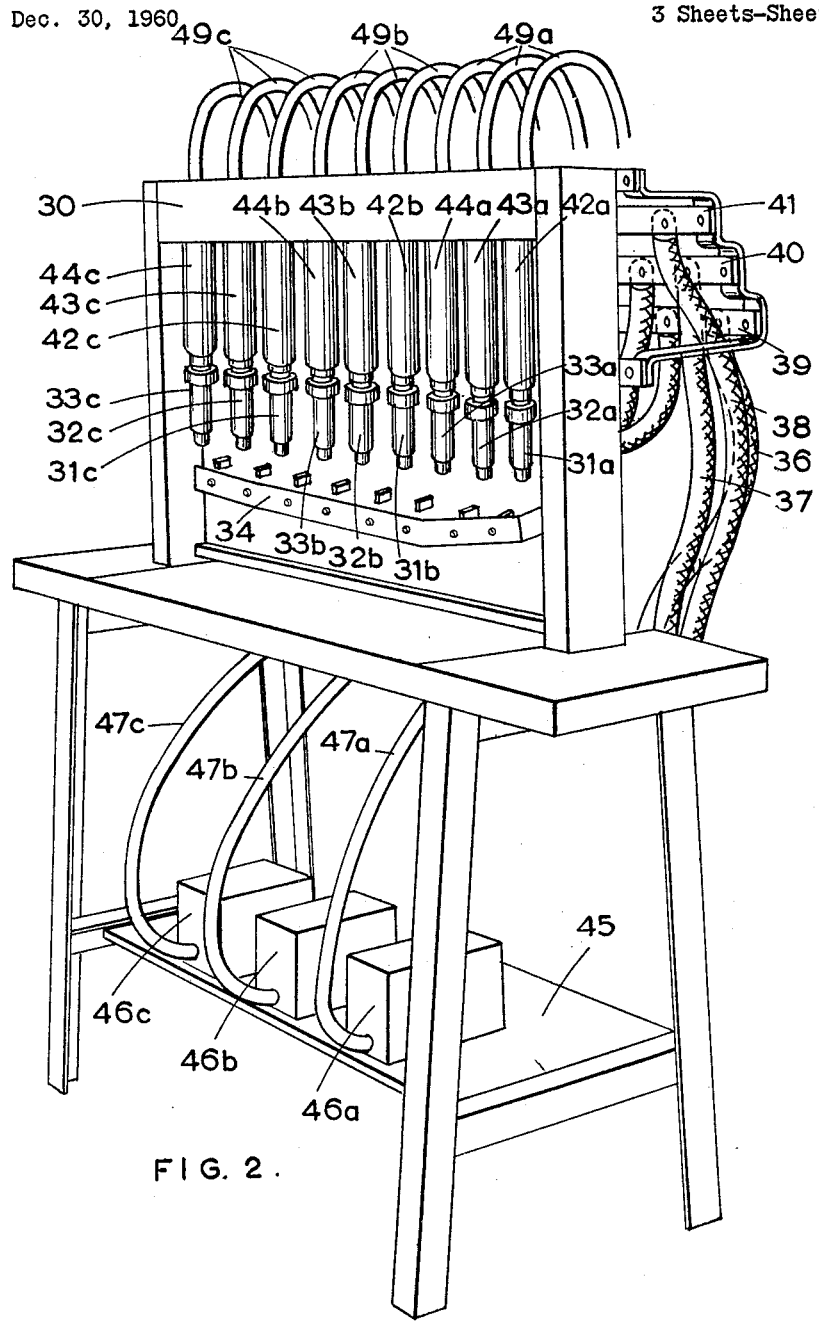
FIGURE 2 is a front perspective view of a welding machine (with parts omitted for the sake of clarity).
Figure 3:
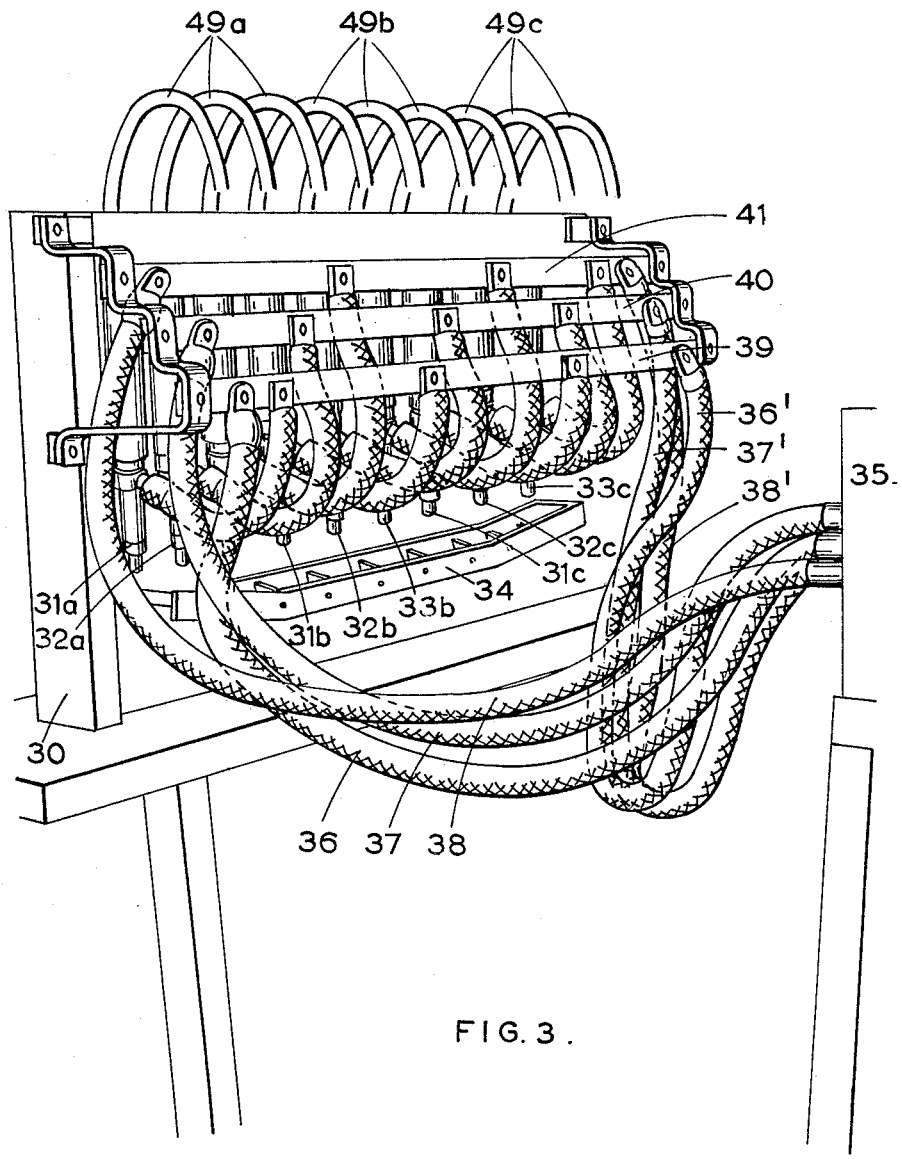
FIGURE 3 is a rear perspective view of the machine shown in FIGURE 2.

The welding machine shown in FIGURES 2 and 3 has a main frame 30 carrying three groups of three welding electrodes 31, 32 and 33 (the respective groups being indicated by the suffixes $a$, $b$ and $c$) and a composite copper back-up bar 34. A three-phase transformer 35 has each phase connected by two leads 36 and $36^1$, 37 and $37^1$ and 38 and $38^1$ to one of the copper bus-bars 39, 40 and 41.

The electrodes of each group are each connected to a different bus-bar, for example electrodes 31$a$, $b$ and $c$ to bus-bar 39, electrodes 32$a$, $b$ and $c$ to bus-bar 40, and electrodes 33$a$, $b$ and $c$ to bus-bar 41.

Each of the electrodes has a pneumatic operating cylinder associated therewith for urging the electrode towards the back-up bar in conventional manner to effect welding, these cylinders being shown at 42$a$, $b$ and $c$, 43$a$, $b$ and $c$, and 44$a$, $b$ and $c$ respectively.

Under the back-up bar 34 the frame carries a platform 45 on which are mounted three air valves 46$a$, $b$ and $c$ supplied with compressed air from a common source (not shown) and are connected by pipes 47$a$, $b$ and $c$ which have trisected ends 49$a$, $b$ and $c$ to the groups of cylinders, one valve to each group. Thus the valve 40$a$ operates the cylinders 42$a$, 43$a$, and 44$a$ and so on.

Figure 4:
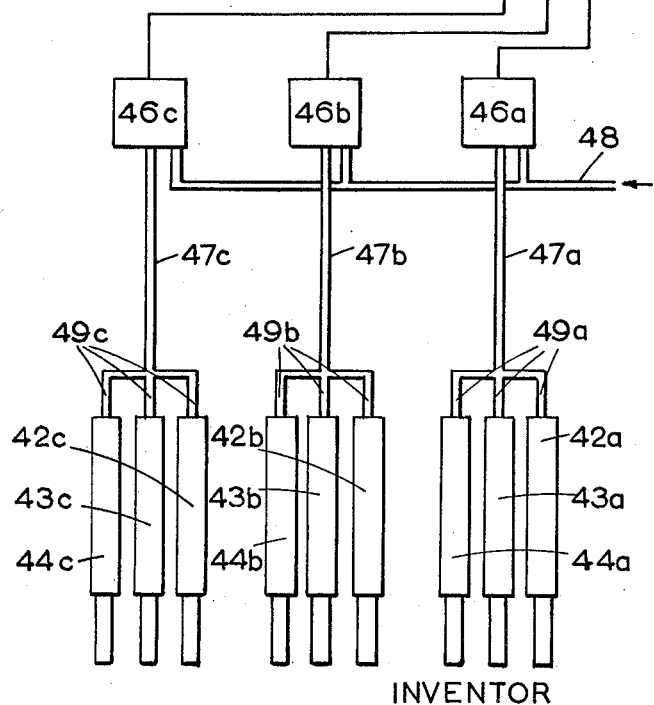
FIGURE 4 is a schematic diagram of operating means for the machine shown in FIGURES 2 and 3.

A schematic diagram of the arrangement of the operating mechanism including the air valves is shown in FIG. 4. Compressed air is supplied via a pipe 48 to all the valves 46$a$, 46$b$ and 46$c$ and the outlets of the valves are connected through pipes 47$a$, $b$ and $c$ which have trisected ends 49$a$, $b$ and $c$ to the groups of cylinders 42, 43 and 44$a$, $b$ and $c$ respectively.

The air valves 46 are electrically operable and are connected to a sequence timing device 50, of known construction, which is adapted to operate the valves in a predetermined sequence and hence urge the groups of welding electrodes towards the bar in a corresponding sequence. The duration of each welding operation is predetermined by the nature of the metal and the thickness of the metal to be welded.

Thus, referring again to FIGS. 2 and 3, two sheet-metal workpieces to be welded to one another are placed on the copper back-up bar 34 with the workpieces overlapping one another in the area to be welded. Preferably the workpieces are clamped into position by clamps (not shown).

The sequence timer 50 shown in FIG. 4 is then switched on and a sequence of three groups of three welds is effected automatically.

It will be understood that the machine may be provided with any number of groups of three electrodes and is in no way limited to the three groups in the machine described and illustrated in the accompanying drawings.

It will be appreciated that the present invention facilitates the welding of a seam following a curved line, the copper back-up bar, or if necessary a number of bars to suit the curvature, may be arranged to follow the curve of the workpieces with the welding electrodes correspondingly disposed.

It will be understood that in the arrangement proposed in the aforesaid specification for moving a single group of electrodes to a sequence of positions the problems to be dealt with in effecting welds along curved tracks can be substantial.

These are overcome by the present invention.

I claim:

A machine for effecting a plurality of groups of welds between two workpieces by resistance welding comprising, a three-phase transformer having its secondary windings connected in star, a group of three bus-bars disposed side-by-side, electrical connectors connecting the outer terminal of each secondary winding to one bus-bar, a back-up bar to support two work-pieces to be welded together, a plurality of groups of three welding electrodes spaced from the back-up bar, electrical connectors connecting corresponding electrodes in each group to one bus-bar, and operating means for urging the electrodes in said group in a predetermined group sequence towards the back-up bar to effect welding of said work-pieces when the transformer is energized.

References Cited in the file of this patent
UNITED STATES PATENTS

| | | |
|---|---|---|
| 1,236,091 | Kicklighter | Aug. 7, 1917 |
| 2,034,411 | Mitchell | Mar. 17, 1936 |
| 2,295,925 | Biederman et al. | Sept. 15, 1942 |

UNITED STATES PATENT OFFICE
CERTIFICATE OF CORRECTION

Patent No. 3,053,973 September 11, 1962

Walter Stewart Simmie

It is hereby certified that error appears in the above numbered patent requiring correction and that the said Letters Patent should read as corrected below.

In the heading to the printed specification, between lines 6 and 7, insert -- Claims priority, application Great Britain Nov. 23, 1960 --.

Signed and sealed this 30th day of April 1963.

(SEAL)
Attest:

ERNEST W. SWIDER
Attesting Officer

DAVID L. LADD
Commissioner of Patents